(12) United States Patent
Kawahara

(10) Patent No.: US 6,393,393 B1
(45) Date of Patent: May 21, 2002

(54) AUDIO CODING METHOD, AUDIO CODING APPARATUS, AND DATA STORAGE MEDIUM

(75) Inventor: Eiji Kawahara, Hiroshima (JP)

(73) Assignee: Matsushita Electric Industrial Co., Ltd. (JP)

(*) Notice: Subject to any disclaimer, the term of this patent is extended or adjusted under 35 U.S.C. 154(b) by 0 days.

(21) Appl. No.: 09/333,004

(22) Filed: Jun. 15, 1999

(30) Foreign Application Priority Data

Jun. 15, 1998 (JP) .......................................... 10-167245

(51) Int. Cl.$^7$ .............................................. G10L 19/12
(52) U.S. Cl. ........................ 704/229; 704/219; 704/500
(58) Field of Search ................................. 704/229, 219, 704/230, 201, 222, 500, 501

(56) References Cited

U.S. PATENT DOCUMENTS 4,956,871 A * 9/1990 Swaminathan .............. 704/229
6,034,632 A * 3/2000 Matsumoto et al. ......... 704/229
6,128,592 A * 10/2000 Miyazaki et al. ........... 704/224

* cited by examiner

*Primary Examiner*—William Korzuch
*Assistant Examiner*—Daniel Abebe
(74) *Attorney, Agent, or Firm*—Parkhurst & Wendel, L.L.P.

(57) ABSTRACT

There is provided an audio coding method which is capable of creating coded data of high-quality with no discontinuity in real time without being affected by processing ability of a CPU on a personal computer and how much another application occupies processing on the CPU, in a scheme in which a digital audio signal is divided into plural frequency bands and a coding process is performed for each subband. In order to generate bit allocation information for each of plural frequency subbands into which a digital audio signal is divided, employed are a process for performing bit allocation with high efficiency using a relationship of a signal to mask based on a predetermined psychoacoustic model and a process for performing bit allocation with a lower load. According to processing amount information of the CPU which is occupied by a coding process, bit allocation means to-be-used is changed.

8 Claims, 18 Drawing Sheets

AUDIO CODING METHOD, AUDIO CODING APPARATUS, AND DATA STORAGE MEDIUM

FIELD OF THE INVENTION

The present invention relates to an audio coding method, an audio coding apparatus, and a data storage medium. More particularly, the present invention relates to an audio coding method and an audio coding apparatus using a subband coding scheme according to an MPEG (Motion Picture Experts Group) standard, and a data storage medium which contains a program for implementing the audio coding method.

BACKGROUND OF THE INVENTION

In recent years, with spread of a multimedia personal computer or internet, it becomes possible to reproduce a moving picture or audio according to MPEG standard by software on the personal computer (PC), and coded data according to MPEG standard has been widely used.

As an encoder for creating coded data, expensive hardware is commonly used. While the coded data is sometimes created by software, since this coding process requires processing time several times as much as real time necessary for playing back a moving picture or audio, a plenty of time and troubles become necessary, and therefore, this has not been widely spread.

In order to make it possible for a PC user to create coded data at a low cost and with ease, it is required that coded data be created in real time by software processing.

Hereinafter, a description will be given of an example of a conventional audio coding method. FIG. 11 is a block diagram showing an MPEG audio encoder standardized by ISO/IEC11172-3 as a format of coded audio data.

Turning to FIG. 11, subband analysis means 202 divides an input digital audio signal into 32 frequency components, and scale factor calculation means 203 calculates scale factors for respective subband signals and makes dynamic ranges for the respective subband signals uniform. The input digital audio signal is also subjected to an FFT (Fast Fourier Transform) process by FFT means 204. Based on this result, psychoacoustic analysis means 205 derives a relationship model of an SMR (Signal to Mask Ratio) based on a psychoacoustic model utilizing a characteristic of men's auditory sense. Then, using this model, the bit allocation means 206 determines the number of bits to be allocated to each subband signal. According to the number of bits allocated to each subband signal, quantization/encoding means 207 quantizes/encodes each subband signal. Bit stream creating means 209 creates a bit stream comprising quantized/encoded data from the quantization/encoding means 207 and header information and auxiliary information which have been encoded by auxiliary information encoding means 208, and outputs the bit stream.

In this conventional audio coding method, a coding process is performed for each subband by utilizing the fact that band power is distributed nonuniformly. Therefore, audio quality is determined by bit distribution for each subband signal using the psychoacoustic model. In addition, since the audio coding method has been standardized for the purpose of using a storage medium, it is well suitable for creating high-quality coded data, but is less suitable for a coding process in real time. The psychoacoustic model which determines audio quality requires a large amount of operation.

The conventional audio coding method and audio coding apparatus are so constructed, and are well suitable for creating high-quality coded data for the storage medium, but are less suitable for processing in real time on the PC by software in view of current CPU's processing ability, because use of the psychoacoustic model requires high processing ability. When operation is performed on the PC on which a high-performance CPU which has capability of real-time processing is mounted, if another application occupies a large part of processing by the CPU, processing cannot be performed in real time. As a consequence, discontinuity of audio might occur.

SUMMARY OF THE INVENTION

It is an object of the present invention to provide an audio coding method and an audio coding apparatus, which are capable of creating coded data of high quality and with no discontinuity without being affected by processing ability of a CPU on a personal computer and how much another application occupies processing on the CPU, and a data storage medium which contains aprogram for implementing this coding process.

Other objects and advantages of the invention will become apparent from the detailed description that follows. The detailed description and specific embodiments described are provided only for illustration since various additions and modifications within the spirit and scope of the invention will be apparent to those skill in the art from the detailed description.

According to a 1st aspect of the present invention, in an audio coding method in which a digital audio signal is divided into a plurality of frequency subbands and a coding process is performed for each subband, there are provided plural bit allocation means according to different processing amounts, for generating bit allocation information for each subband, and bit allocation means to be used is changed to perform bit allocation according to external control information such that bit allocation means is selected from the plural bit allocation means and used, whereby the coding process is performed. Therefore, bit allocation means according to an optimum processing amount is always selected and used, and a coding process in which the amount of processing on the CPU which can be occupied by the coding process is not exceeded is realized in an active state. Thereby, when coding the input signal in real time, processing of the input signal will not be delayed. As a result, audio can be reproduced with no discontinuity.

According to a 2nd aspect of the present invention, in the audio coding method of the 1st aspect, a load value indicating a processing amount of a central processing unit which can be occupied by the coding process is used as the external control information, and the bit allocation means is selected such that the processing amount of the central processing unit which can be occupied by the coding process is not exceeded, according to the load value, with reference to a data table which contains respective processing amounts of coding operation by the respective bit allocation means in the coding process on the central processing unit. Therefore, the central processing unit does not accept a request beyond its processing ability, whereby the whole system is controlled smoothly.

According to a 3rd aspect of the present invention, in the audio coding method of the second aspect, processing amount control information from monitoring means for monitoring a processing amount of the central processing unit which can be occupied by the coding process is used as the load value. Therefore, within the highest performance of the central processing unit which can be occupied by the coding process, bit allocation means according to the optimum processing amount is selected. Thereby, when coding the input signal in real time, processing of the signal will not be delayed. As a result, audio can be reproduced with no discontinuity.

According to a 4th aspect of the present invention, in the audio coding method of the 1st aspect, the bit allocation performed by the bit allocation means includes: a process using highly-efficient bit allocation for performing bit allocation with higher efficiency, which realizes high-quality coded data; and a process using low-load bit allocation for performing bit allocation with a lower-load, which performs processing less than the process using highly-efficient bit allocation. Therefore, the encoder carries out a coding process by using processing for higher-quality coded audio data or lower-load processing.

According to a 5th aspect of the present invention, in the audio coding method of the 1st aspect, the bit allocation means to be used in the coding process is changed frame by frame corresponding to a minimum unit decodable into an audio signal. Therefore, in the coding process in real time, when another application which occupies processing on the CPU suddenly increases, the coding process is performed frame by frame according to the amount of processing on the CPU which can be occupied by the coding process. In addition, audio quality or processing amount can be controlled in real time.

According to a 6th aspect of the present invention, in the audio coding method of the 1st aspect, subband signals of the plural frequency subbands into which the digital audio signal is divided are separated into groups each composed of a predetermined number of subband signals continuous in a frequency axis direction, the bit allocation is performed for each of the groups, and the bit allocation information is generated for each subband. Therefore, a bit allocation process adapted to the characteristics of respective subbands is selected, whereby the coding process is performed.

According to a 7th aspect of the present invention, in audio coding method of the 6th aspect, the subband signals are separated into groups variably such that either the number of groups or the number of subband signals continuous in the frequency axis direction in each group are specified according to either the external control information or processing amount control information from monitoring means. Therefore, grouping is conducted dynamically according to the usage state of the CPU.

According to an 8th aspect of the present invention, in the audio coding method of the 7th aspect, the number of subband signals is changed frame by frame corresponding to a minimum unit decodable into an audio signal. Therefore, bit allocation is selected from several alternatives, and thereby an encoder with higher precision is realized.

According to a 9th aspect of the present invention, in the audio coding method of the 8th aspect, when the subband signals are separated into groups, at least one group to which bit allocation is not performed is provided. Since frame by frame corresponding to the minimum unit decodable into the audio signal, the number of groups and the number of subband signals continuous in a frequency axis direction in each group are changed according to external control information or processing amount control information from monitoring means, subband signals in a group to which bit allocation is not performed need not be coded, and therefore, the bits are allocated to subbands in another group to which bit allocation should be performed. As a result, the amount of processing on the CPU which is occupied by the coding process is controlled, and simultaneously, audio quality of subband signals in another group is improved.

According to a 10th aspect of the present invention, in the audio coding method of the 6th aspect, the subband signals are separated into groups, and then subband signals in a low-band group are subjected to highly-efficient bit allocation which realizes high-quality coded data and subband signals in a high-band group are subjected to low-load bit allocation which performs processing less than the highly-efficient bit allocation. Therefore, for the low-band to which men's ears are highly sensitive, high-quality coded audio data is obtained, while for the high-band to which men's ears are less sensitive, low-load bit allocation is performed, whereby the coding process is performed while reducing the total processing amount.

According to an 11th aspect of the present invention, in the audio coding method of the 6th aspect, allocatable bit calculation means for determining the number of bits allocatable to bit allocation means for each group is provided, for distributing bits allocatable to all groups such that bits are allocated to bit allocation means for each group, by using a ratio of each group to all groups which has been weighted based on characteristics of respective subbands in each group. Therefore, bits are distributed to bit allocation means for each group which realizes high-quality coded audio data taking psychoacoustic characteristics into account.

According to a 12th aspect of the present invention, in the audio coding method of the 11th aspect, weighting based on characteristics of respective subbands in each group is weighting based on predetermined minimum audible limit values for respective subbands. Therefore, bit allocation effective to men's hearing is performed.

According to a 13th aspect of the present invention, in the audio coding method of the 11th aspect, weighting based on characteristics of respective subbands in each group is weighting based on subband signal levels of respective frequency subbands in each group obtained by subjecting the input digital audio signal to subband analysis. Thereby, effective bit allocation is performed.

According to a 14th aspect of the present invention, in the audio coding method of the 11th aspect, weighting based on characteristics of respective subbands in each group is weighting based on spectrum signal levels in each group obtained by linearly transforming the input audio signal. Thereby, effective bit allocation is performed.

According to a 15th aspect of the present invention, in the audio coding method of the 6th aspect, signals in a group at levels higher than a predetermined threshold are subjected to highly-efficient bit allocation which realizes high-quality coded audio data, and signals in a group at levels lower than the predetermined threshold are subjected to low-load bit allocation which performs processing less than the highly efficient bit allocation. Since less significant subband signals are subjected to the low-load processing, higher-quality coded data is achieved.

According to a 16th aspect of the present invention, in the audio coding method of the 15th aspect, the levels of signals in each group are levels of subband signals obtained by subjecting the input digital audio signal to subband analysis. Thereby, effective bit allocation is performed.

According to a 17th aspect of the present invention, in the audio coding method of the 15th aspect, the levels of signals in each group are levels of spectrum signals obtained by linearly transforming the input digital audio signal. Thereby, effective bit allocation is performed.

According to an 18th aspect of the present invention, in the audio coding method of the 15th aspect, the levels of signals in each group are predetermined minimum audible limit values for respective subbands. Therefore, bit allocation effective to men's hearing is performed.

According to a 19th aspect of the present invention, in the audio coding method of the 4th, 10th, and 15th aspects, the process using the highly-efficient bit allocation is performed according to a relationship of a signal to mask ratio based on a predetermined psychoacoustic model, and the process using the low-load bit allocation is performed by adding predetermined minimum audible limit values for respective subbands to signal levels of plural frequency subbands. Therefore, the processing amount of the system can be reduced without degrading audio quality.

According to a 20th aspect of the present invention, in the audio coding method of the 19th aspect, the psychoacoustic model is a psychoacoustic model specified according to an MPEG (Motion Picture Experts Group) standard. Therefore, the same effects as described above are obtained in the audio coding process according to MPEG standard.

According to a 21st aspect of the present invention, in the audio coding method of the 5th or 8th aspect, the frame corresponding to the minimum unit which is decodable into the audio signal is a frame specified according to an MPEG standard. Therefore, the same effects as described above are obtained in the audio coding process according to MPEG standard.

According to a 22nd aspect of the present invention, in the audio coding method of the 1st aspect, the bit allocation means generates bit allocation information for each subband according to information output from a predetermined psychoacoustic model, generates the bit allocation information according to the information output from the predetermined psychoacoustic model every N (N=1, 2, 3 . . . ) frames, and generates the bit allocation information for frames for which the bit allocation information is not generated, according to the information output from the psychoacoustic model and signal information of the respective subbands. Therefore, the load on the CPU in the time axis direction is reduced.

According to a 23rd aspect of the present invention, in the audio coding method of theist aspect, a psychoacoustic model which is capable of controlling a processing amount stepwise is provided, the processing amount of the psychoacoustic model is controlled according to the external control information, and bit allocation information for each subband is generated so that processing is performed by the use of the psychoacoustic model according to a predetermined processing amount. Therefore, the load on the CPU is controlled by using psychoacoustic effects.

According to a 24th aspect of the present invention, in the audio coding method of the 1st aspect, plural psychoacoustic models according to different processing amounts are provided, and a psychoacoustic model to be used is changed to generate bit allocation information for each subband according to the external control information such that a psychoacoustic model is selected from the plural psychoacoustic models and used to perform processing. Therefore, the load on the CPU is controlled by using psychoacoustic effects with ease.

According to a 25th aspect of the present invention, in an audio coding method in which a digital audio signal is divided into plural frequency subbands, bit allocation is generated for each subband, and a coding process is performed for each subband to make transmission at a given bit rate, a range of bit allocation for a frame in which data is inserted into a coded data stream is controlled, and thereby the amount of coded audio data is controlled variably. Therefore, effective use of a band is realized by using various data for surplus subbands.

According to a 26th aspect of the present invention, in the audio coding method of the 25th aspect, the range of bit allocation is controlled frame by frame according to external control information, and thereby the amount of coded audio data is controlled variably. Therefore, the load on the CPU can be reduced effectively.

According to a 27th aspect of the present invention, in the audio coding method of the 26th aspect, data amount control information from means for monitoring a buffer for storing data to be added is used as the external control information. Therefore, data to-be-added can be used with priority.

According to a 28th aspect of the present invention, in the audio coding method of the 1st aspect, load value information of respective processing of either the plural bit allocation means or plural psychoacoustic models is output externally, according to performance of a central processing unit on which the coding process is performed, at initialization prior to the coding process. Therefore, information relating to performance of the central processing unit to be used is obtained prior to the coding process, whereby the load on the CPU can be reduced effectively.

According to a 29th aspect of the present invention, in the audio coding method of the 28th aspect, the load value information is output externally in ascending or descending order. Therefore, the coding means can be selected quickly.

According to a 30th aspect of the present invention, in an audio coding method in which a video signal and an audio signal are coded by the same central processing unit, a coding process is performed according to plural different operation amounts, and a coding amount of either the audio signal or the video signal is changed, and thereby the total operation amount of processing on the central processing unit is controlled. Therefore, in the process for both the audio signal and the video signal, processing associated with the load on the CPU is conducted.

According to a 31st aspect of the present invention, in an audio coding method in which a video signal and an audio signal are coded by the same central processing unit, a coding process is performed using plural coding schemes according to different operation amounts, and a coding scheme for coding the audio signal is changed, and thereby the total operation amount of processing on the central processing unit is controlled. Therefore, in the process for both the audio signal and the video signal, processing associated with the load on the CPU is conducted.

According to a 32nd aspect of the present invention, in the audio coding method of the 30th or 31st aspect, the processing on the central processing unit is controlled according to external control information. Therefore, the load on the CPU can be effectively reduced.

According to a 33rd aspect of the present invention, in an audio coding method in which a digital audio signal is subjected to time/frequency transformation, to generate quantization information, and thereby a coding process is performed, there are provided plural quantization information calculation means according to different operation amounts, and quantization information calculation means to be used is changed to generate quantization information according to external control information such that quantization information calculation means is selected from the plural quantization information calculation means and used. Therefore, in the coding apparatus which performs time/frequency transformation, the load placed on the CPU can be reduced.

According to a 34th aspect of the present invention, there is provided an audio coding apparatus which performs an audio coding process by using the audio coding method of the 1st to 33rd aspects. Therefore, in equipment such as a VTR camera which incorporates the audio coding method, the effects as described above are obtained.

According to a 35th aspect of the present invention, there is provided a data storage medium for storing steps of the audio coding method of the 1st to 33rd aspects. Therefore, the audio coding method is incorporated by the use of the data storage medium, whereby the same effects described above are obtained.

DETAILED DESCRIPTION OF THE PREFERRED EMBODIMENTS

Now, a description will be given of an audio coding method and an audio coding apparatus according to preferred embodiments of the present invention with reference to figures.

Embodiment 1

Figure 1:
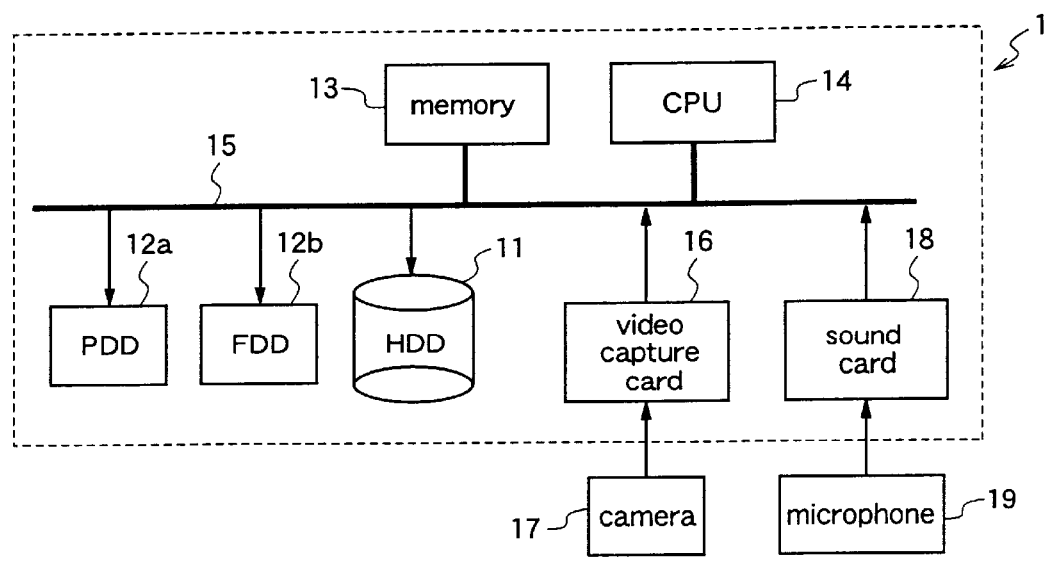
FIG. 1 is a block diagram showing a system using a personal computer as an implementation of an audio coding apparatus using an audio coding method according to a first embodiment of the present invention.

Hereinafter, a description will be given of a coding method in which an input signal is divided into a plurality of frequency components and a coding process is performed for each subband by utilizing the fact that band power is distributed nonuniformly. FIG. 1 is a conceptual diagram showing the whole system in which a personal computer (PC) is used as an audio coding apparatus according to the coding method. In FIG. 1, reference numeral 1 denotes a multimedia PC into which data is input from external equipment such as a camera 17 and a microphone 19, and comprises a hard disc drive (HDD) 11 as a fixed storage medium which has a large storage capacity for storing various data and programs, a PD drive 12a and an FD drive 12b as detachable storage media which have relatively small storage capacities, for performing I/O operations of programs or data between the HDD11 and the same. The program stored in the HDD 11 is suitably read on a memory 13 constituted by an RAM (random access memory) or the like, according to an instruction from a CPU (central processing unit) 14, and executed. To capture video and audio in the camera 17 and the microphone 19, a video capture card 16 and a sound card 18 are built in the PC, respectively. In so constructed PC 1, respective components are connected by means of an internal bus 15.

Figure 2:
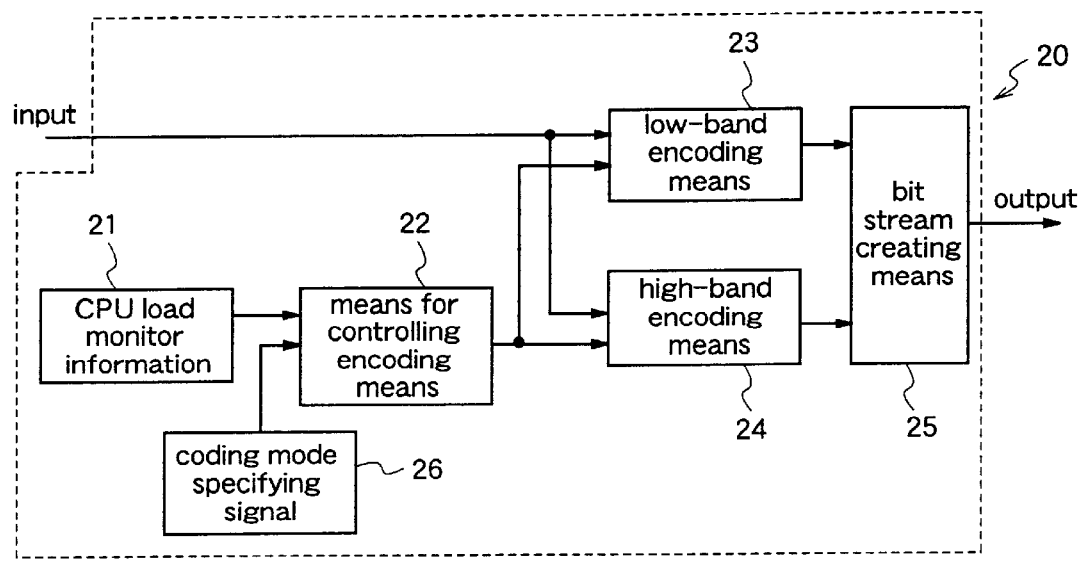
FIG. 2 is a block diagram showing a structure of an encoder of the audio coding apparatus of the first embodiment.

FIG. 2 is a block diagram showing an encoder 20 of an audio coding apparatus for implementing an audio coding process performed by the PC 1 shown in FIG. 1, and is actually implemented by the program read on the memory 13 from the HD 11. In FIG. 2, reference numeral 21 denotes CPU load monitor information with which a load status of the CPU 14 is monitored, and reference numeral 22 denotes means (control means)for controlling encoding means which controls operation of low-band encoding means 23 and high-band encoding means 24 according to the CPU load monitor information 21. Reference numeral 25 denotes bit stream creating means for creating a stream signal from outputs of the encoding means 23 and 24. Reference numeral 26 denotes a coding mode specifying signal which is input to the control means 22 by a user.

Figure 3:
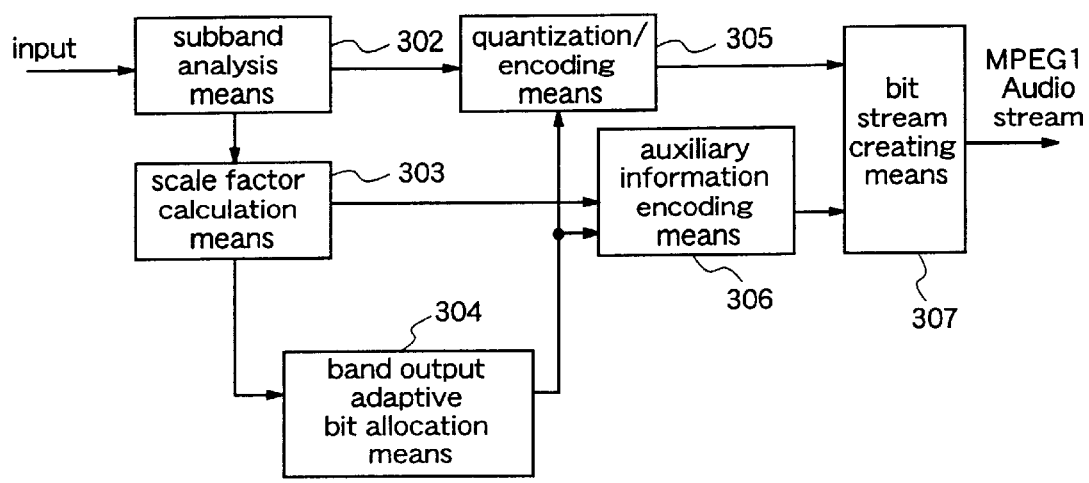
FIG. 3 is a block diagram showing a detailed structure of high-band encoding means included in the encoder.
Figure 11:
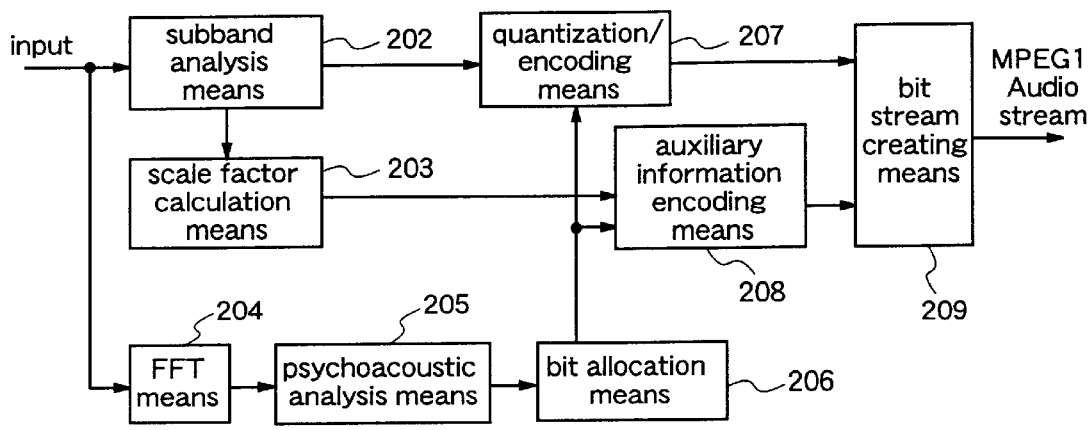
FIG. 11 is a block diagram showing an encoder of a conventional audio coding apparatus.

As construction of the low-band encoding means 23 shown in FIG. 2, for example, construction shown in FIG. 11 may be employed. As construction of the high-band encoding means 24, for example, like the conventional example shown in FIG. 11, as shown in FIG. 3, employed is a coding scheme for performing a coding process for each subband by utilizing the fact that band power is distributed nonuniformly, although bit allocation for each subband signal using the psychoacoustic model is not performed, but instead, there is provided band output adaptive bit allocation means 304, for weighting scale factors of subband signals based on characteristics of auditory sense of men. This construction aims at low-load processing rather than high-quality audio processing.

In addition, in order to avoid concentration of bit allocation to a specified subband, the weighting is adjusted for each subband per bit allocation.

Figure 4:
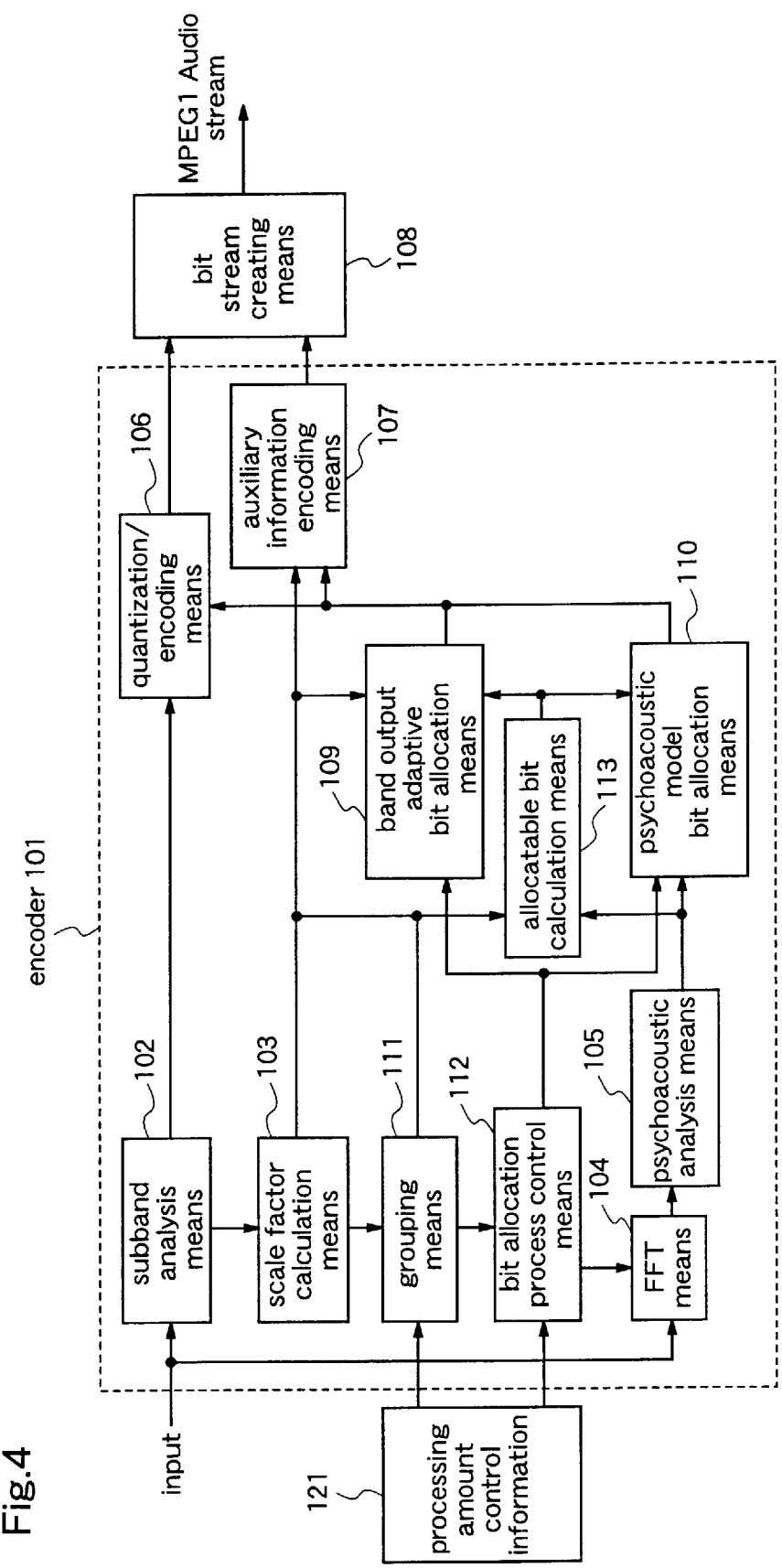
FIG. 4 is a block diagram showing a detailed structure of the encoder of the audio coding apparatus of the first embodiment.

FIG. 4 is a block diagram showing a detailed structure of the encoder 20 shown in FIG. 2. In FIG. 2, reference numeral 101 denotes an encoder, which comprises subband analysis means 102, scale factor calculation means 103, FFT means 104, psychoacoustic analysis means 105, quantization/encoding means 106, auxiliary information encoding means 107, bit stream creating means 108, band output adaptive bit allocation means 109, psychoacoustic model bit allocation means 110, grouping means 111, bit allocation process control means 112, and allocatable bit calculation means 113.

Figure 5:
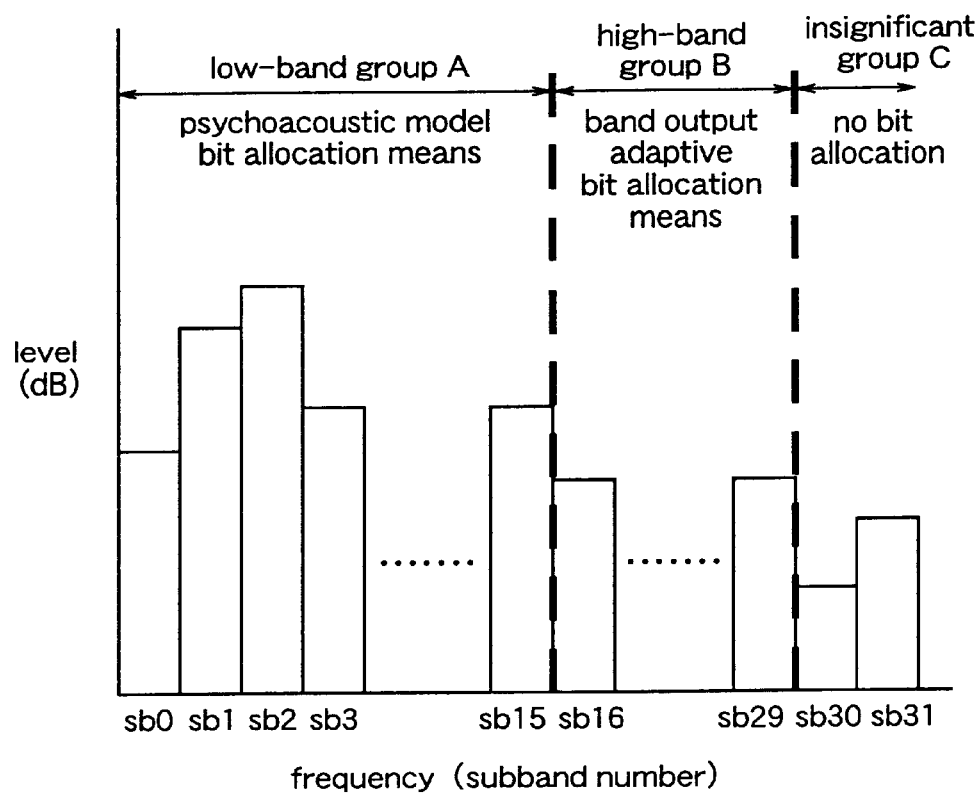
FIG. 5 is a diagram showing an example of a bit allocation process for each group, which is included in the audio coding method of the first embodiment.

The subband analysis means 102 divides an input digital audio signal into 32 frequency components. The scale factor calculation means 103 calculates scale factors for respective subband signals and makes dynamic ranges for respective subbands uniform. The grouping means 111 separates the 32 frequency components into groups of the number specified by processing amount control information 121 as control information externally input. In this first embodiment, as shown in FIG. 5, the number of groups is set to "3". Subband signals in each of the groups are continuous in a frequency-axis direction. Three groups are a low-band group A composed of subbands 0–15, a high-band group B composed of subbands 16–29, and an insignificant group C composed of subbands 30 and 31 for which bit allocation is not performed. Suppose that the processing amount control information 121 includes the CPU load monitor information 21 and the coding mode specifying signal 26. In this first embodiment, as bit allocation means for allocating bits to bands in respective groups, the psychoacoustic model bit allocation means 110 and the band output adaptive bit allocation means 109 are used. The psychoacoustic model bit allocation means 110 performs bit allocation for the low band to which men's ears are highly sensitive, with high efficiency, by using a relationship of the SMR based on the psychoacoustic model specified according to MPEG standard. The band output adaptive bit allocation means 109 performs bit allocation for the high band to which men's ears are less sensitive, with a load lower than the psychoacoustic model bit allocation, by using addition of scale factor information from the scale factor calculation means 103 and the preset minimum audible limit value for each subband.

The bit allocation process control means 112 controls the FFT means 104 so that the FFT means 104 subjects the input digital audio signal to the FFT process before psychoacoustic analysis of the low band group A composed of 0–15 subbands to be subjected to the psychoacoustic model bit allocation. From this transformation result, the psychoacoustic analysis means 105 derives the relationship model of the SMR value based on the psychoacoustic model using characteristics of men's auditory sense.

The allocatable bit calculation means 113 calculates the number of bits allocatable to the groups determined by sampling frequencies or coding bit rates in such a way that it calculates the number of allocatable bits for the bit allocation means for each group, by using the ratio of each group to which bits are to be allocated to all groups, which has been weighted based on characteristics of respective subbands in each group. In this first embodiment, taking scale factor index values and a ratio of the low band/high band, and based on the number of bits to be allocated to all groups, the number of bits to be allocated to each of the psychoacoustic model bit allocation means 110 and the band output adaptive bit allocation means 113 is determined.

Actually, from respective scale factor index values scf_index [i] calculated by the scale factor calculation means 103, according to the following expressions (1) and (2), addition values Vpsy and Vnon of the scf_index [i] for respective groups are calculated.

$$Vpsy = \sum_{i=0}^{psy\_end-1} scf\_indx[i] \qquad (1)$$

$$Vnon = \sum_{i=psy\_end}^{subband\_end} scf\_indx[i] \qquad (2)$$

where psy_end=16 is the number of subbands to which psychoacoustic model bit allocation is to be performed, and subband-end=30 is the number of subbands to which bit allocation is to be performed.

Then, in order to allocate more bits to the low band to which men's ears are highly sensitive, the Vspy is weighted as follows:

$$Vpsy=Vpsy*0.75$$

To find the number of bits allocatable to the psychoacoustic model bit allocation "psy_num", and the number of bits allocatable to the band output adaptive bit allocation "non_num", the following expressions are adopted:

$$Vnon=Vnon*psy\text{-}ratio$$

$$psy\_num=all\_alloc\_num*Vnon/(Vpsy+Vnon)$$

$$non\_num=all\_alloc\_num-psy\_num,$$

where all_alloc_num is the number of bits to be allocated to all groups, and psy_ratio is psy_end/(subband_end-psy_end).

Within a range of bits allocatable to each group (psy_num , non_num), the psychoacoustic model bit allocation means 110 allocates bits to the subbands 0–15 in the low-band group A by using the relationship model of the SMR value from the psychoacostic analysis process means 105, while the band output adaptive bit allocation means 109 allocates bits to the subbands 16–29 in the high-band group B. For the subbands 30 and 31 in the insignificant group C, since they are assumed to be insignificant subbands, bit allocation will not be performed.

According to the number of bits to be allocated to respective subband signals which is determined by these bit allocation means, the quantization/encoding means 106 quantizes/encodes respective subband signals, and then the bit stream creating means 108 creates a bit stream based on the resulting quantized/encoded subband signals and header information and auxiliary information which have been encoded by the auxiliary information encoding means 107.

Figure 6:
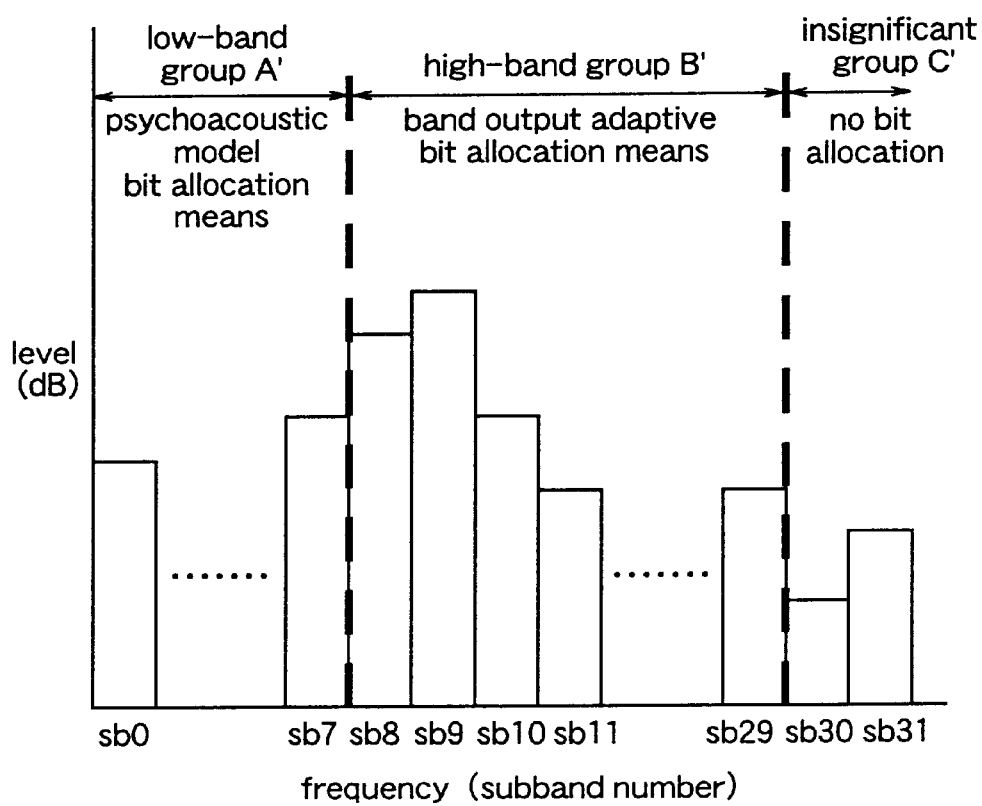
FIG. 6 is a diagram showing another example of a bit allocation process for each group, which is included in the audio coding method of the first embodiment.

When the processing amount control information 121 is, for instance, information for reducing an encoding amount, as shown in FIG. 6, a bandwidth for the low-band group A composed of the subbands 0–15 to which the psychoacoustic model bit allocation means 110 allocates bits is reduced to a low band group A' composed of subbands 0–7, while a bandwidth for the high band group B composed of subbands 16–29 to which the band output adaptive bit allocation means 109 allocates bits is increased to a high-band group B' composed of subbands 8–29. Furthermore, to realize the least encoding amount, the band output adaptive bit allocation means 109 is adapted to allocate bits to subbands 0–29. In this case, the psychoacoustic model bit allocation means 110 does not operate substantially, and therefore the FFT means 104 and the psychoacoustic analysis means 105 do not operate, either.

On the other hand, when the processing amount control information unit 121 is, for instance, information for improving quality of coded audio data, the bandwidth of subbands to which the psychoacoustic model bit allocation means 110 which is capable of highly efficient bit allocation to realize high-quality audio data, should allocate bits, is increased. Furthermore, in order to realize the highest possible quality, the psychoacoustic model bit allocation means 110 is adapted to allocate bits to the subbands 0–29.

In this embodiment, increase/decrease in the subbands or change of the bit allocation means is carried out frame by frame corresponding to a minimum unit which is decodable into an audio signal, thereby controlling the encoding amount in real time.

Figure 7:
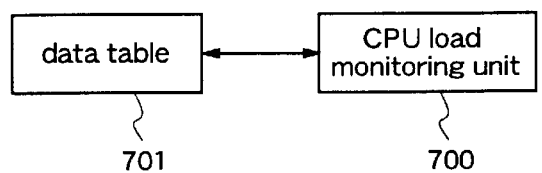
FIG. 7 is a diagram showing flow for explaining coding operation of the encoder of the coding apparatus of the first embodiment.
Figure 7:
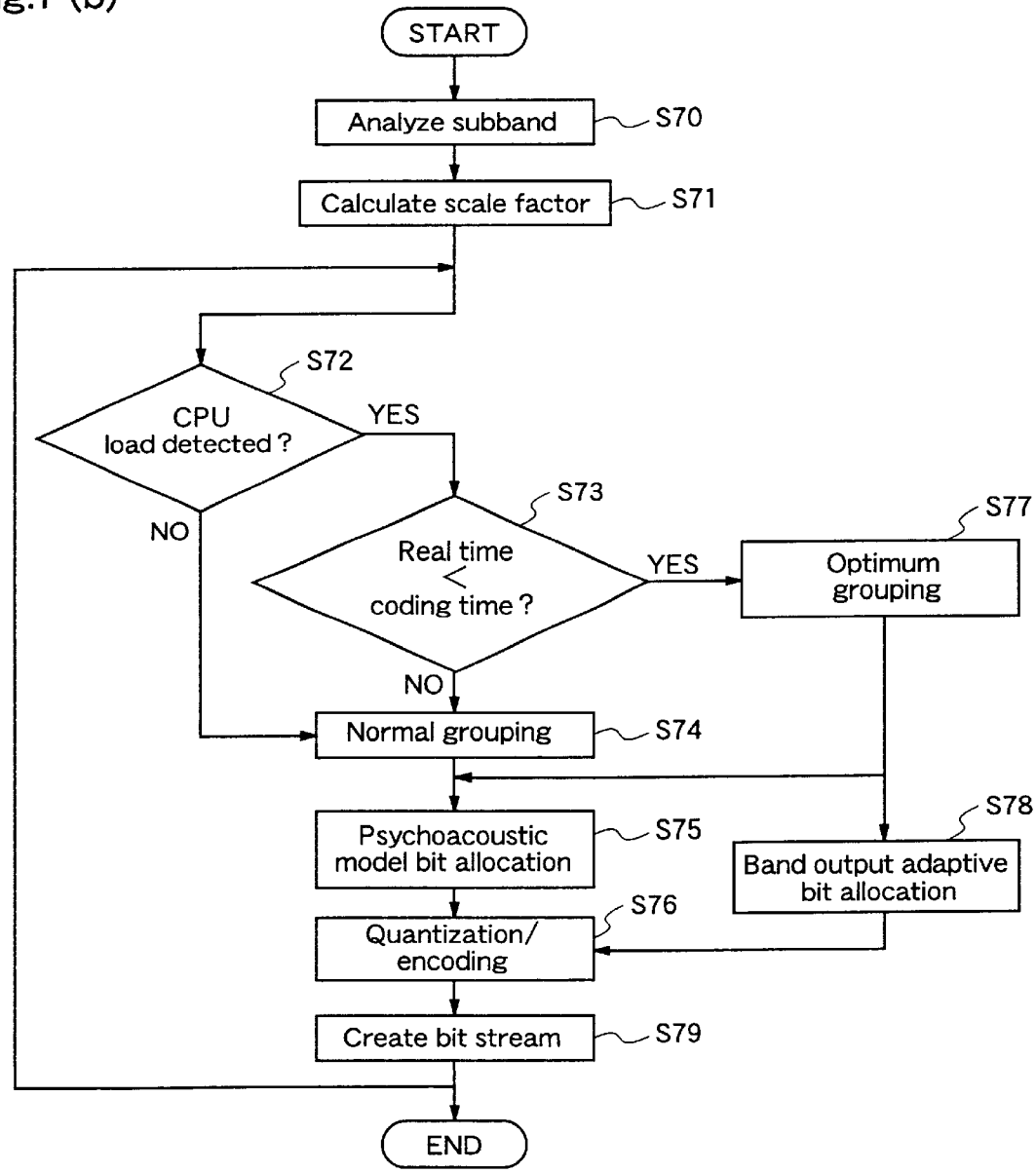

Subsequently, flow of operation of the audio coding apparatus of the first embodiment will be described with reference to FIG. 7. Initially, construction shown in FIG. 7(a) is used. In order to recognize a processing load placed on each of the encoders, dummy data during a predetermined time period is encoded in each mode of each encoder (according to change of the bandwidth of subbands to which bit allocation is to be performed), and thereby a CPU load monitoring unit 700 stores a CPU load value in each mode in a data table 701.

When sample (data) is input, in step S70. shown in FIG. 7(b), subband analysis of the sample data is conducted and the sample data is divided into 32 frequency components. Then in step S71, scale factors of respective subbands are calculated.

Then, in step S72, it is decided whether or not a CPU load has been detected. Since operation just starts, the CPU load is not detected, and hence advance is made to step S74, where normal grouping. is conducted so that the highest-quality audio is reproduced. Then, in step S75, the psychoacoustic model bit allocation process is performed. In step S76, a quantization/encoding process is performed. Finally, in step S79, the bit stream is created, whereby a series of processing is completed. At the completion of this processing, time required for coding a predetermined number of samples is posted to the CPU load monitoring unit 700, and thereby a current load on the CPU is detected.

So, in subsequent processing, in step S72, it is decided that the CPU load has been detected. In step S73, when decided that the detected CPU load cannot be encoded in real time, in step S77, an optimum mode (grouping) is selected with reference to the data table 701. Then, step S78 (band output adaptive bit allocation process) and step S75 (psychoacoustic model bit allocation process) are respectively performed at a predetermined rate. Then, in step S76, the quantization/encoding process is performed. Finally, in step S79, the resulting coded data is created into the bit stream.

While in the first embodiment, the allocatable bit calculation means 113 calculates the number of bits to be allocated to the bit allocation means for each group, taking the scale factor index values and the ratio of the low band to the high band into account, the scale factor index values may be replaced by spectrum signal levels of respective groups from the FFT means 104 or the minimum audible limit values preset for respective subbands.

In addition, while the encoder 101 includes the CPU load monitoring means 700 for monitoring a processing amount of the CPU to control a processing amount of the encoder 101 so that the encoder 101 operates within the CPU's processing ability, this information may be control information externally input by a user. The user input enables an encoding process resulting in a audio quality and an image quality according to preference of the user.

Figure 8:
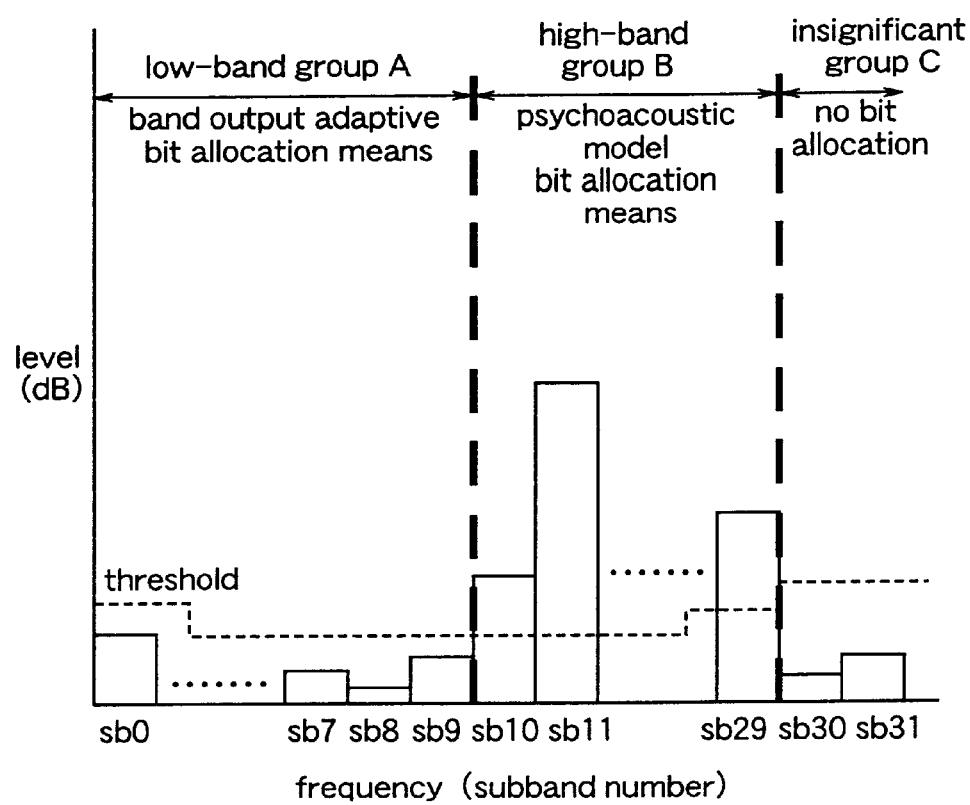
FIG. 8 is a diagram showing an example of a bit allocation process for each group using a threshold, which is included in the audio coding method of the first embodiment.

Further, as bit allocation means of the encoder 101 used on a fixed basis in the first embodiment, employed are the psychoacoustic model bit allocation means 110 which performs bit allocation to the low band to which men's ears are highly sensitive, with higher efficiency, and the band output adaptive bit allocation means 109 which performs bit allocation to the high band to which men's ears are less sensitive, with the lower load placed on the CPU. When decided that levels of subband signals in each group are below preset thresholds for respective subbands, based on the signal from the scale factor calculation means 103, that is, as shown in FIG. 8, significant coded data in the low band is less than that in the high band, the bit allocation means need not be used on a fixed basis according to the respective bands. Instead, the psychoacoustic model bit allocation means 110 may be used for the high band.

Figure 9:
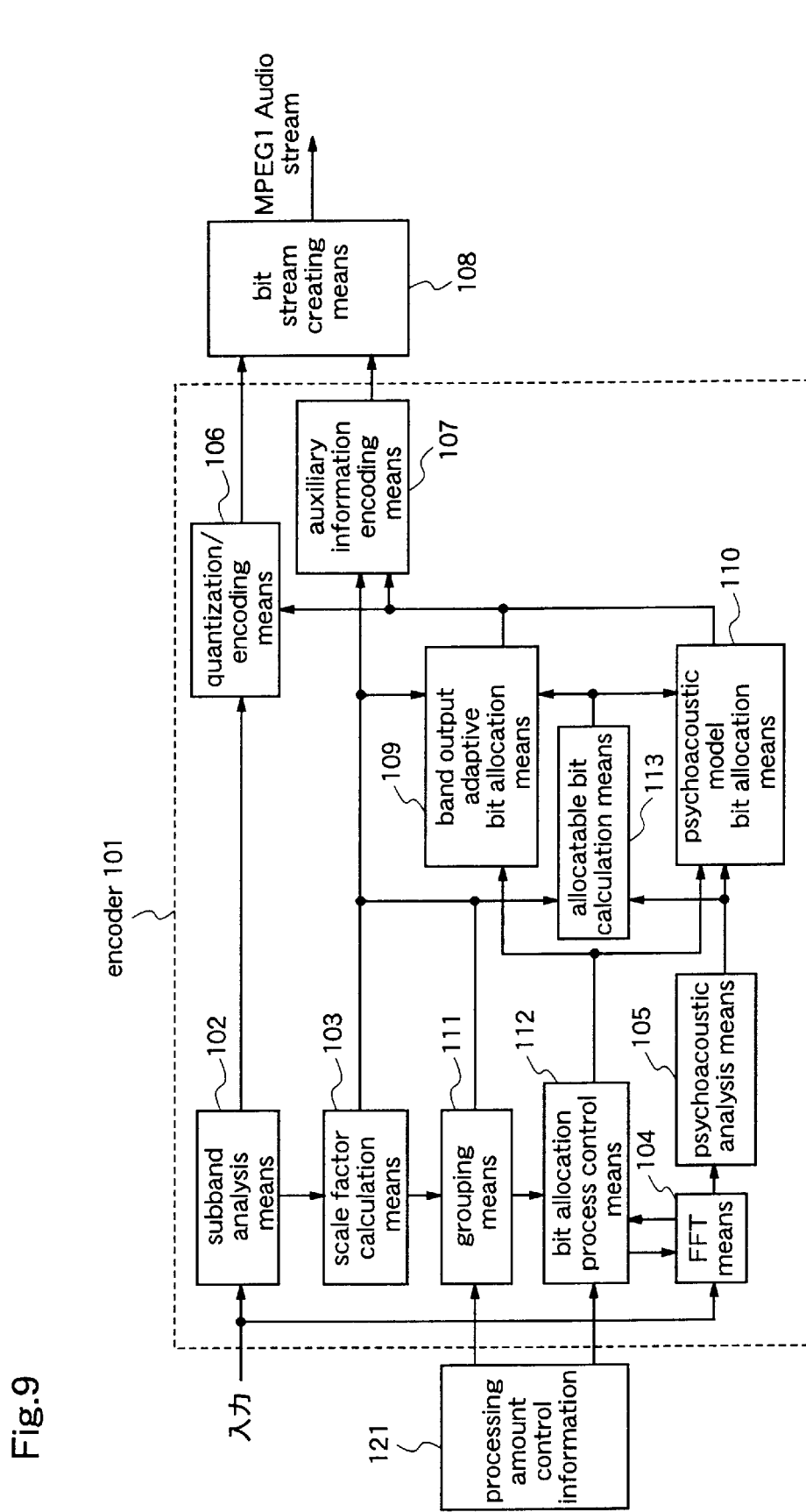
FIG. 9 is a block diagram showing a detailed structure of modification of the encoder of the coding apparatus of the first embodiment.

Moreover, instead of comparison between the levels of subband signals in each group and the thresholds based on the signal from the scale factor calculation means 103, as shown in FIG. 9, a signal from the FFT means 104, which has a frequency higher than the signal from the scale factor calculation means 103, may be input to the bit allocation process control means 112, and thereby comparison may be made between the levels of the subband signals in each group and the preset thresholds.

Embodiment 2

A description will be given of a data storage medium according to a second embodiment of the present invention.

When a coding program for realizing construction of the audio coding apparatus or the coding method of the first embodiment is stored in a data storage medium such as a floppy disk, processing described in the first embodiment can be easily implemented in an independent computer system.

Figure 10:
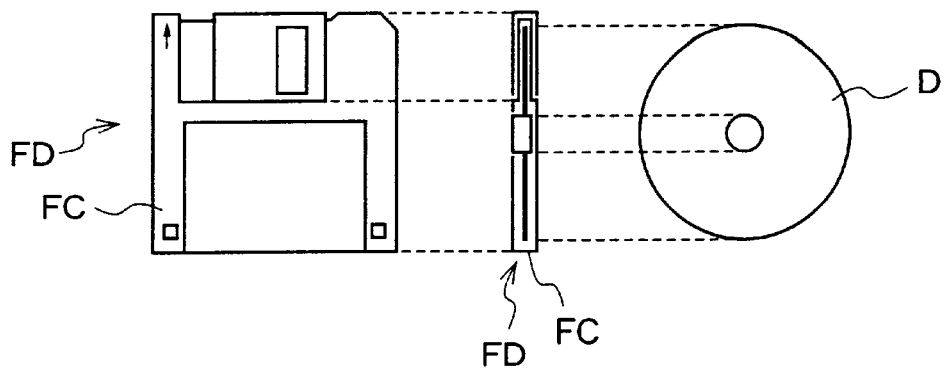
FIG. 10 is a block diagram showing a data storage medium and construction of an audio coding apparatus using the data storage medium according to a second embodiment of the present invention.
Figure 10:
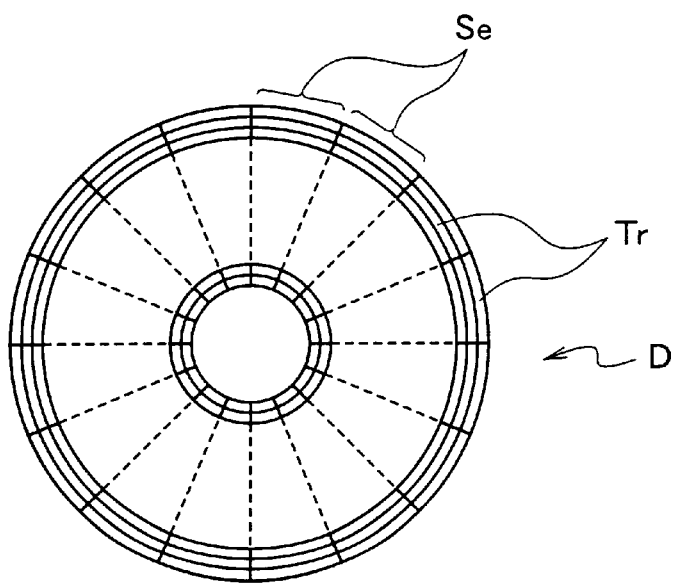
Figure 10:
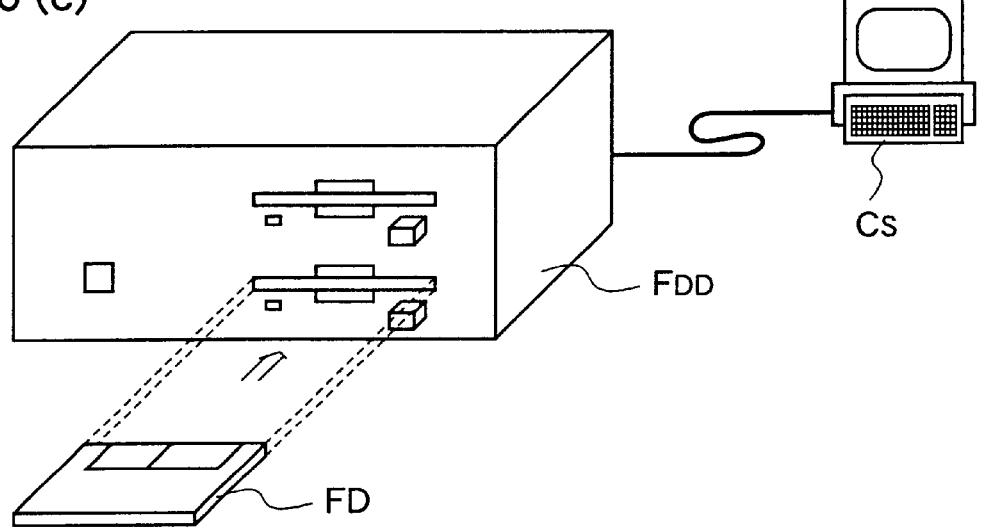

FIGS. 10(a)–10(c) are diagrams for explaining the case where the coding process of the first embodiment is executed by a computer system, using a floppy disk which contains the image coding program.

FIG. 10(a) shows a front view of a floppy disk FD, a cross-sectional view thereof, and a floppy disk body D. FIG. 10(b) shows an example of a physical format of the floppy disk body D.

The floppy disk FD has the configuration in which a floppy disk case FC contains the floppy disk body D. On the surface of the floppy disk body D, a plurality of tracks Tr are formed concentrically from the outer circumference of the disk toward the inner circumference. Each track Tr is divided into 16 sectors (Se) in the angular direction. Therefore, in the floppy disk FD having the above-mentioned program, data of the program is stored in the assigned sectors on the floppy disk body D.

FIG. 10(c) illustrates the construction for storing the program in the floppy disk FD and performing the image processing using the program stored in the floppy disk FD.

To be specific, when the program is stored in the floppy disk FD, data of the program is written in the floppy disk FD from the computer system Cs through the floppy disk drive FDD. When the above-described audio coding apparatus is constructed in the computer system Cs by the program recorded in the floppy disk FD, the program is read from the floppy disk FD by the floppy disk drive FDD and then loaded to the computer system Cs.

While in the above description the floppy disk is employed as the data storage medium, an optical disk may be employed to perform an audio coding process by software like the floppy disc. Further, the data storage medium is not restricted to the floppy disc and the optical disc. Any medium may be employed as long as it can contain the program, for example, an IC card, ROM cassette, etc. In this case, also, the audio coding process by software can be performed in a like manner as the case of using the floppy disk.

Embodiment 3

A description will be given of an audio coding method and an audio coding apparatus according to a third embodiment of the present invention with reference to figures. As the construction of the high-band encoding means 24 shown in FIG. 2, for example, construction shown in FIG. 3 is employed. As the construction of the low-band encoding means 23, a coding scheme in which a coding process is performed for each subband utilizing the fact that band power is distributed nonuniformly, like the case shown in FIG. 11, is employed, although bit allocation to each subband signal by using only the predetermined psychoacoustic analysis means is not performed. Instead, as shown in FIG. 12, there is provided a simplified psychoacoustic model unit 4062 for performing less amount of processing, whereby a bit allocation process is performed according to bit allocation information generated based on a masking threshold for a previous frame output from the psychoacoustic model unit 4601 and subband signals of a current frame.

Figure 12:
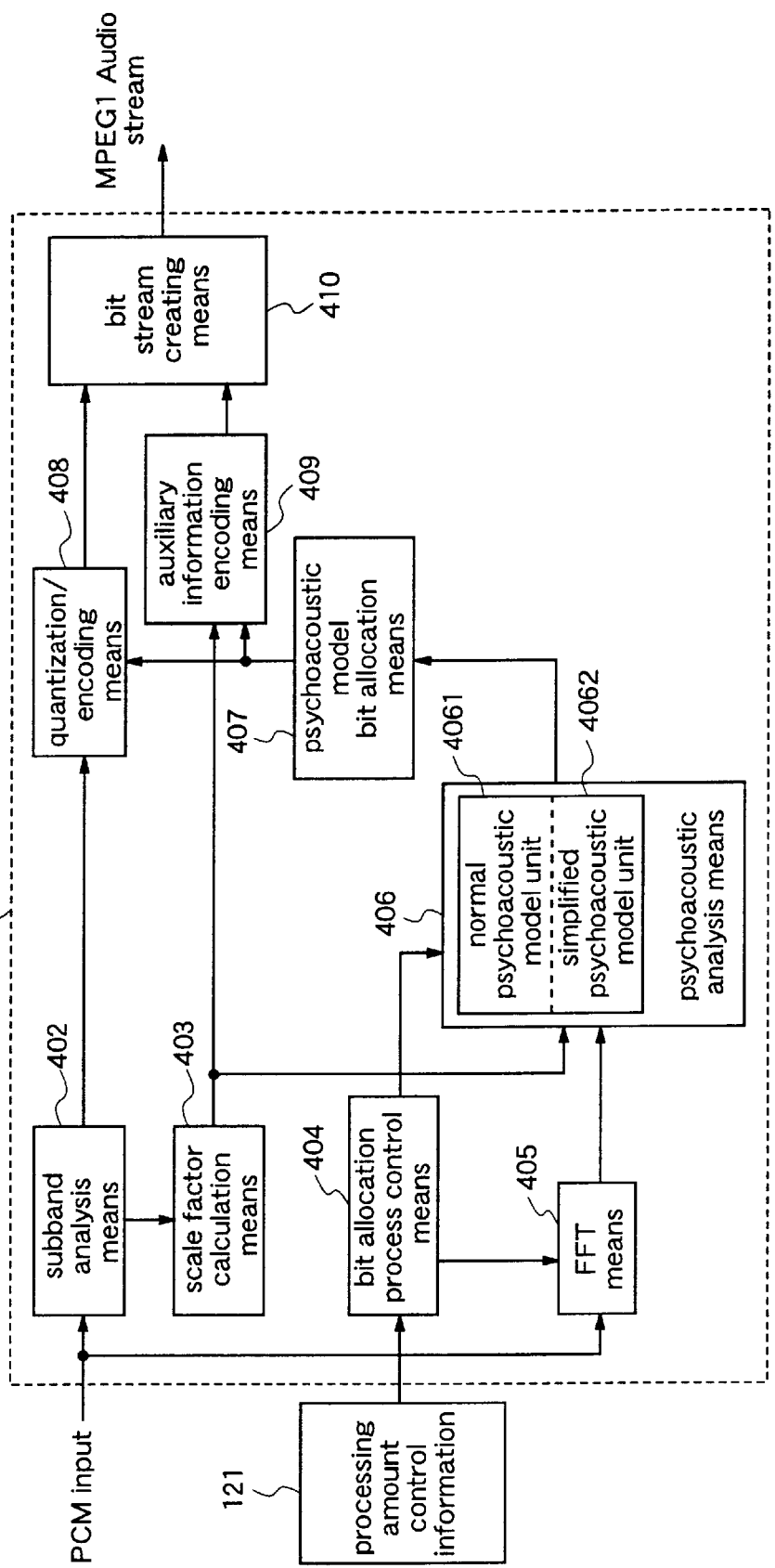
FIG. 12 is a diagram showing a detailed structure of low-band encoding means included in an audio coding apparatus according to a third embodiment of the present invention.

FIG. 12 is a block diagram showing a detailed structure of the low-band encoding means 23 shown in FIG. 2. In FIG. 12, reference numeral 401 denotes an encoder, comprises subband analysis means 402, scale factor calculation means 403, bit allocation process control means 404, FFT process means 405, psychoacoustic analysis means 406, psychoacoustic model bit allocation means 407, quantization/encoding means 408, auxiliary information encoding means 409, and bit stream creating means 410.

Subsequently, operation will be described.

The subband analysis means 402 divides an input digital audio signal into 32 frequency components. The scale factor calculation means 403 calculates scale factors of respective subband signals, and makes respective subband dynamic ranges uniform. The FFT process means 405 subjects the input digital audio signal to an FFT process. The psychoacoustic analysis means 406 is constituted by a normal psychoacoustic model unit 4061 specified according to MPEG standard and the simplified psychoacoustic model unit 4062 which performs processing less than the normal psychoacoustic model unit 4061, each of which calculates the SMR.

The normal psychoacoustic model unit 4061 calculates the SMR of each subband signal according to the following expression (3), while the simplified psychoacoustic model unit 4062 does not calculate the minimum masking level of each subband in the current frame, but calculates the SMR based on the minimum masking level of the previous (most recent) frame calculated by the normal psychoacoustic model unit 4061 and a sound pressure based on a scale factor value of the current frame calculated by the scale factor calculation means 403.

$$SMR_{sb}(n)=L_{sb}(n)-LT_{min}(n) db \qquad (3)$$

where Lsb(n) is a sound pressure of each subband, and $LT_{min}(n)$ is the minimum masking level of each subband.

$$SMR_{sb}(n)=L_{sb}(n)-LT_{min}(n) db \qquad (4)$$

where Lsb(n)=20·log ($scf_{max}$(n)·32768-10) db, $scf_{max}$(n) is a scale factor value of each subband in the current frame, and $LT_{min}(n)$ is a most recent minimum masking level of each subband calculated by the normal psychoacoustic model unit 4061.

Figure 13:
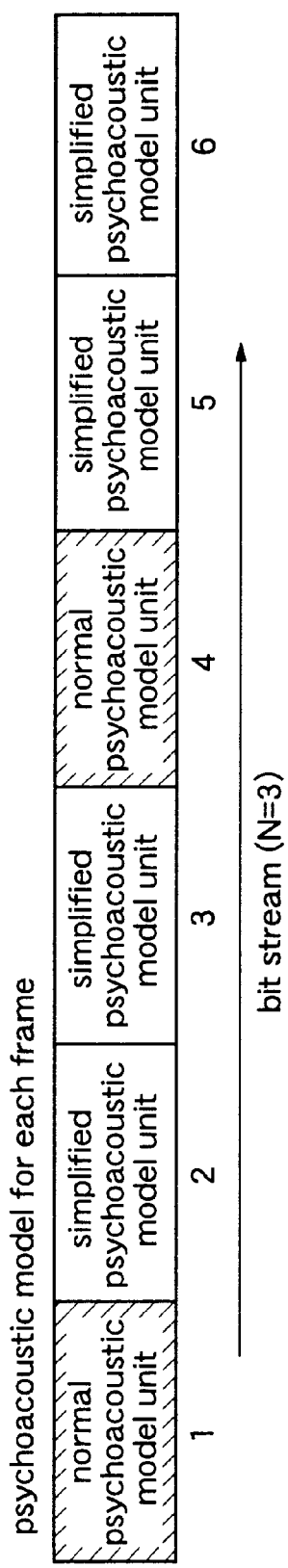
FIG. 13 is a diagram for explaining a psychoacoustic model for each frame in a low-band coding process performed by the audio coding apparatus of the third embodiment.

The bit allocation process control means 404, according to the processing amount control information unit 121 and assuming that "N"=3 as shown in FIG. 13, controls processing of the simplified psychoacoustic model unit 4062 which realizes low-load processing and the normal psychoacoustic model unit 405 which outputs optimum bit allocation information with which higher-quality audio is realized, that is, decides the ratio of usage of these units in terms of frames, and controls the FFT process by the FFT process means 405, that is, decides whether or not the FFT process should be performed by the FFT process means 405.

For instance, in the example shown in FIG. 13, when the processing amount control information 121 which reduces a ratio of the coding process to the CPU processing, is posted to the bit allocation process control means 404, the value of "N" is increased in order to increase usage of the simplified psychoacoustic model unit 4062 which performs less amount of processing. Conversely, when the information which increases the ratio of the coding process to the CPU processing, is posted to the bit allocation process control means 404, the value of "N" is reduced in order to increase usage of the normal psychoacoustic model unit 4061 which realizes high-quality audio. The processing amount can be thus controlled.

The psychoacoustic model bit allocation means 407 allocates bits to each of the subband signals divided by the subband analysis means 402, according to the relationship of the SMR as the information from the psychoacoustic analysis means 406. The quantization/encoding means 408 quantizes and encodes respective subband signals. The bit stream creating means 410 creates the resulting quantized/encoded signals and auxiliary data from the auxiliary information encoding means 409 into the bit stream.

Thus, in accordance with the third embodiment, since bit allocation is performed every N frames, the load placed on the CPU in time axis direction can be reduced.

While in this embodiment, the low-band encoding means shown in FIG. 2 is used as the encoder 401, the encoder 401 may encodes all subband signals as well as the low-band signals.

Embodiment 4

A description will be given of an audio coding method and an audio coding apparatus with reference to figures. A coding apparatus shown in FIG. 14, like the coding apparatus shown in FIG. 11, employs the coding scheme in which the coding process is performed for each subband by utilizing the fact that band power is distributed nonuniformly, and difference between them is that the apparatus shown in FIG. 14 has a capability of adding external data other than audio data to a bit stream to be output. As the external data, image data or text data may be used.

Figure 14:
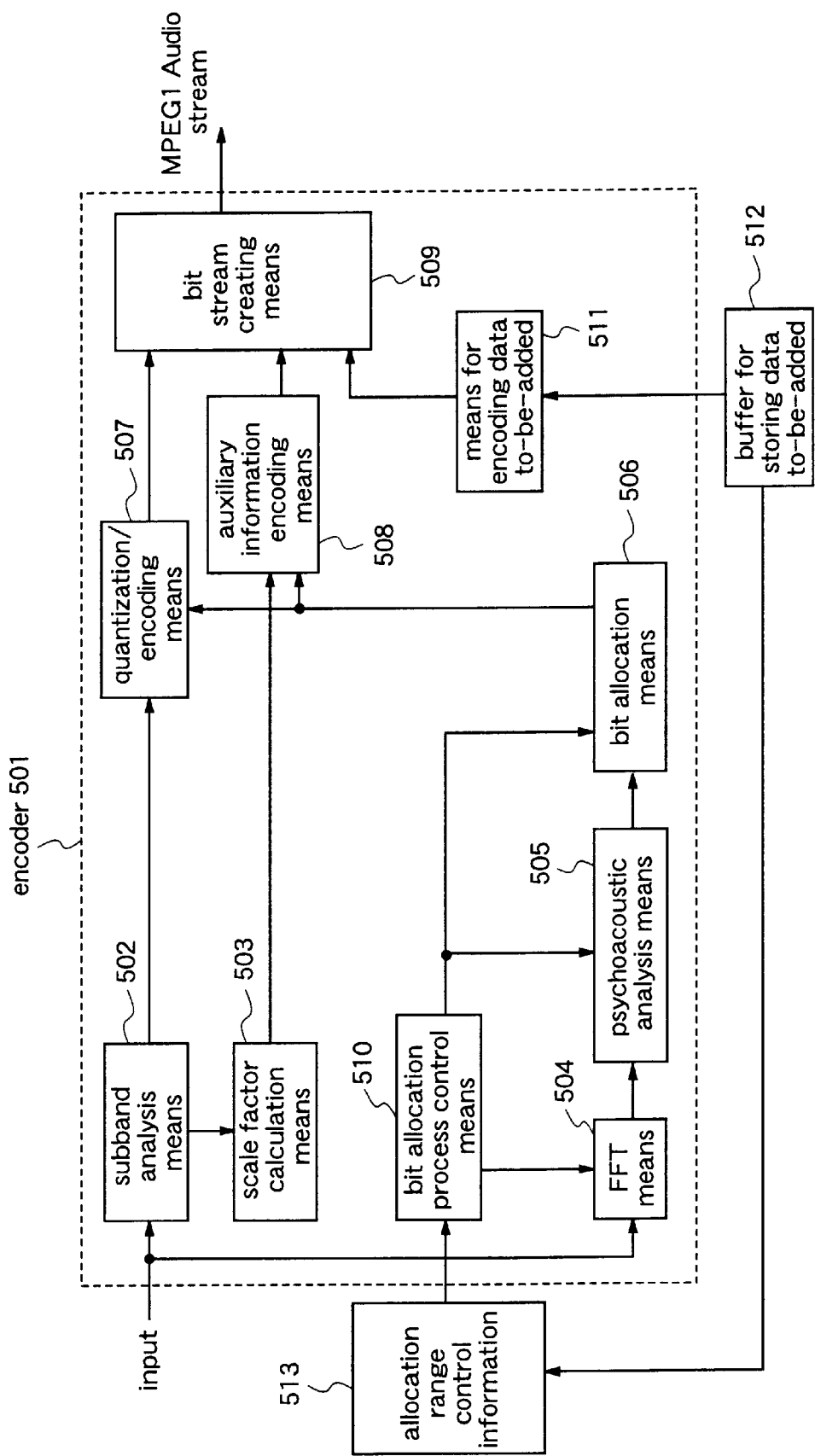
FIG. 14 is a diagram showing a detailed structure of low-band encoding means included in an audio coding apparatus according to a fourth embodiment of the present invention.

Turning to FIG. 14, an encoder 501 comprises subband analysis means 502, scale factor calculation means 503, FFT process means 504, psychoacoustic analysis means 505, bit allocation means 506, quantization/encoding means 507, auxiliary information encoding means 508, bit stream creating means 509, bit allocation process control means 510, and means for encoding data to-be-added 511.

Operation will be described.

The subband analysis means 502 divides an input digital audio signal into 32 frequency components. The scale factor calculation means 503 calculates scale factors of respective subbands and makes respective subband dynamic ranges uniform. The FFT process means 504 subjects the input digital audio signal to the FFT process. The psychoacoustic analysis means 505 computes the SMR based on the psychoacoustic model specified according to MPEG standard.

The bit allocation process control means 510 monitors a buffer 512 for temporarily storing data to be added into the bit stream to be output, and specifies a range of bit allocation by the bit allocation means 506, according to allocation range control information 513 generated according to decision on whether or not there is data to-be-added in the buffer 512 or decision on whether or not the data to-be-added overflows in the buffer 512.

Figure 15:
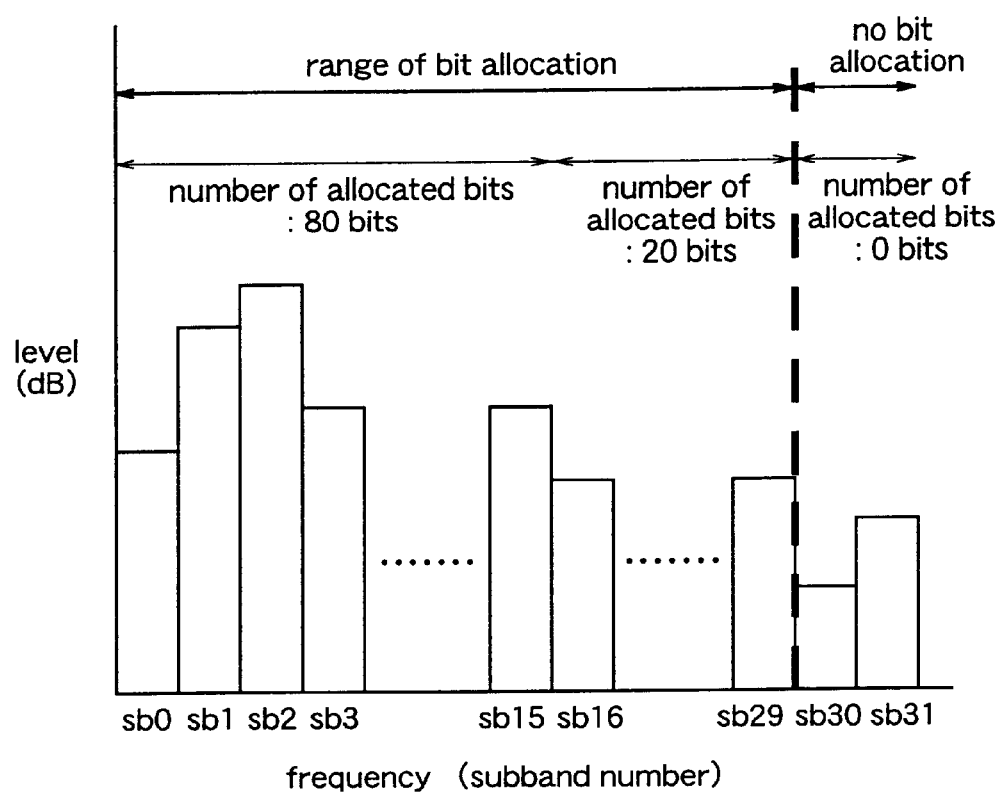
FIG. 15 is a diagram showing an example of a bit allocation process by the audio coding apparatus of the fourth embodiment.

For instance, when there is no data in the buffer 512, as shown in FIG. 15, bits are allocated to subbands 0–29. In this case, among 100 bits to be allocated for all the subbands, 80 bits are allocated to subbands 0–15 and 20 bits are allocated to subbands 16–29.

Data is written externally into the buffer 512, and thereby when decided that there is data to-be-added in the buffer 512, the allocation range control information 513 for insertion of data to-be-added is posted to the bit allocation process control means 510. In this fourth embodiment, according to the information 513, 80 bits are allocated to subbands 0–15, and bits are not allocated to subbands 16–29 to which bit allocation is to be originally performed but the remaining 20 bits are allocated to the data to-be-added. For the subbands subsequent to the subband 15, the FFT process and the psychoacoustic analysis process need not be performed in order to reduce the processing amount.

Thereafter, the quantization/encoding means 507 quantizes/encodes bit-allocated subbands, and then the bit stream creating means 509 creates a bit stream based on quantized/encoded subband signals and auxiliary data from the auxiliary information encoding means 508, for example, ancillary data according to MPEG standard, and outputs the bit stream.

Thus, in accordance with the fourth embodiment, when making transmission at a given bit rate, according to the amount of data to-be-added other than the audio data, the range of bit allocation in the coding process is controlled and the amount of audio data to-be-coded is made variable, whereby the data to-be-added is inserted into the coded data stream. As a result, effective use of a band is realized by using various data for surplus subbands.

The range of bit allocation performed by the bit allocation process control means 510 is performed frame by frame, and is made variable according to the amount of data in the buffer 512.

These processing enables control of the amount of data to-be-inserted in real time without degrading audio quality within the range of bit allocation when inserting the data to-be-added.

Embodiment 5

Figure 16:
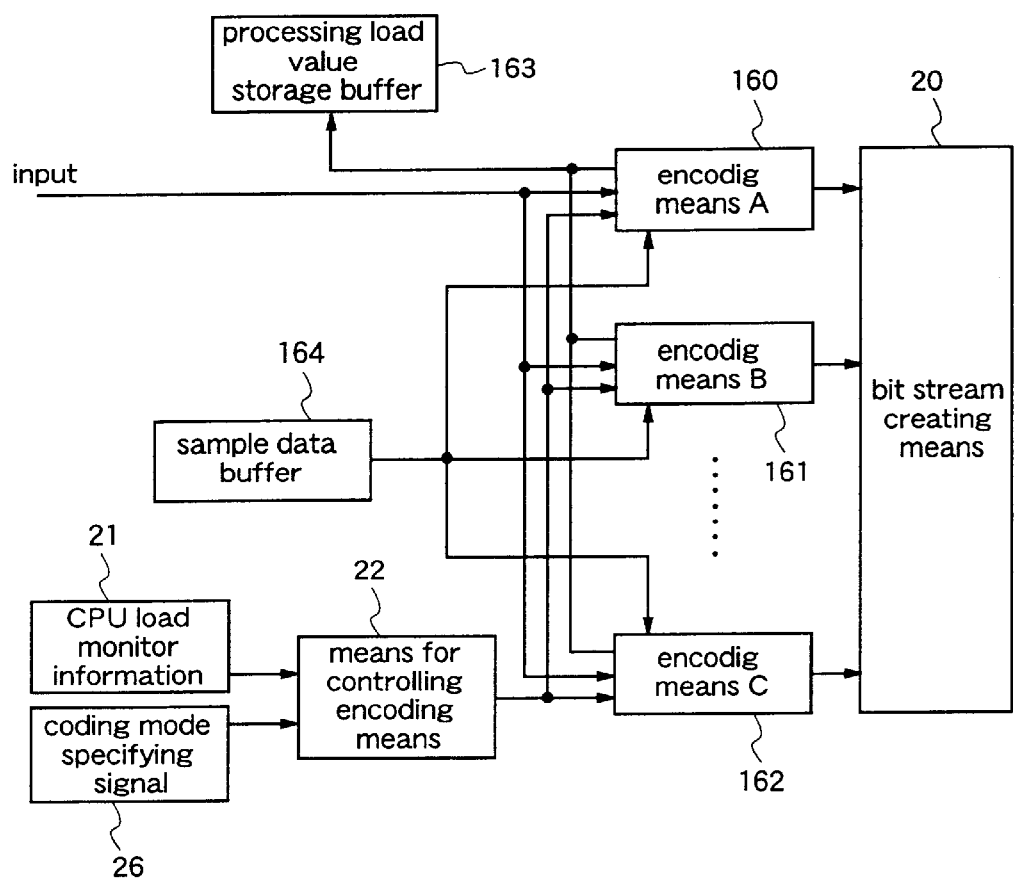
FIG. 16 is a block diagram showing a structure of an encoder of an audio coding apparatus according to a fifth embodiment of the present invention.

A description will be given of an audio coding method and an audio coding apparatus according to a fifth embodiment of the present invention with reference to figures. FIG. 16 is a block diagram showing a structure of an encoder of the audio coding apparatus using the audio coding method of the fifth embodiment. In the figure, the same reference numerals as those shown in FIG. 2 denote the same or the corresponding parts. Reference numerals 160–162 denote encoding means A–C which are independently operable, 163 denotes a processing load value storage buffer for storing processing load value information of the respective encoding means A–C, and reference numeral 164 denotes a sample data buffer for supplying sample data to the respective encoding means A–C.

Operation will be described. Prior to the coding process, at initialization, predetermined sample data stored in the sample data buffer 164 is supplied to the respective encoding means A–C, and the resulting processing load values of the encoding means A–C or the psychoacoustic models are stored in the buffer 163.

The processing load values are output in ascending or descending order, and thereby encoding means adapted to performance of the CPU used in the apparatus is selected quickly, whereby the coding process is carried out by the selected encoding means.

How the coding process is performed is the same as shown in the first embodiment, and therefore will not be discussed.

Thus, in accordance with the fifth embodiment, at initialization prior to the coding process, the respective encoding means operate according to the sample data, whereby the load values at that point of time are obtained, and according to the load values, the encoding means adapted to the processing ability of the CPU is selected. Thereby, an optimum coding process is carried out.

While in each of the above embodiments, the audio coding apparatus is implemented by the use of the PC, a VTR camera, a DVD encoder, and the like, which are built in equipment, may be employed.

Figure 17:
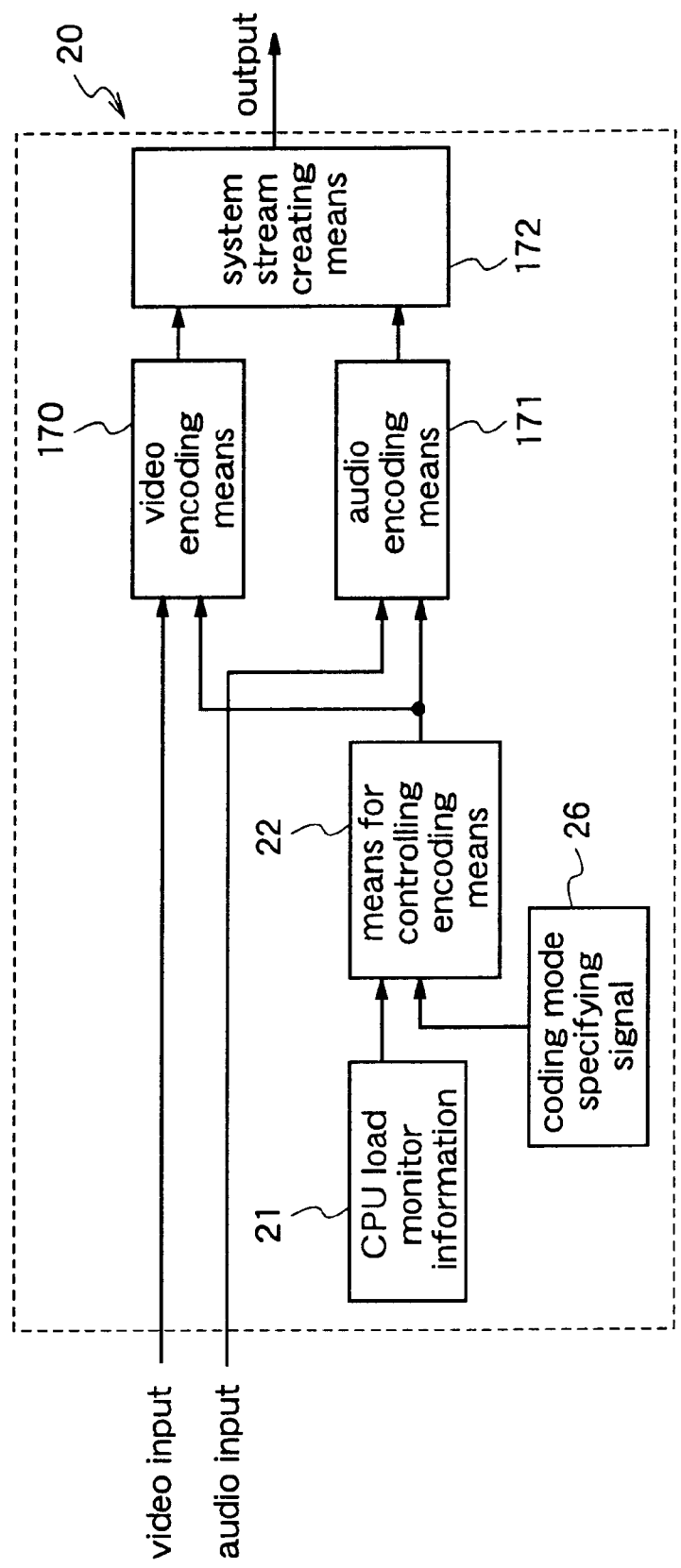
FIG. 17 is a block diagram showing a structure of an encoder which handles an audio signal and a video signal.

In addition, while in each of the above embodiments, only audio is handled, both audio and video are processed in the following way. Turning to FIG. 17, the low-band encoding means and the high-band encoding means 23 and 24 in the construction shown in FIG. 2 are replaced by video encoding means 170 and audio encoding means 171, which receive a video signal and an audio signal, respectively, and the bit stream creating means 25 in the construction shown in FIG. 2 is replaced by system stream processing means 172. With this construction, the operation amount of the audio coding process is changed, or switching among plural coding schemes of different operation amounts is performed, according to control information externally input and by the methods described in the above embodiments, whereby the total operation amount of the CPU can be controlled. Further, according to the amount of audio signals to be coded, the amount of video signals to be coded may be changed.

Figure 18:
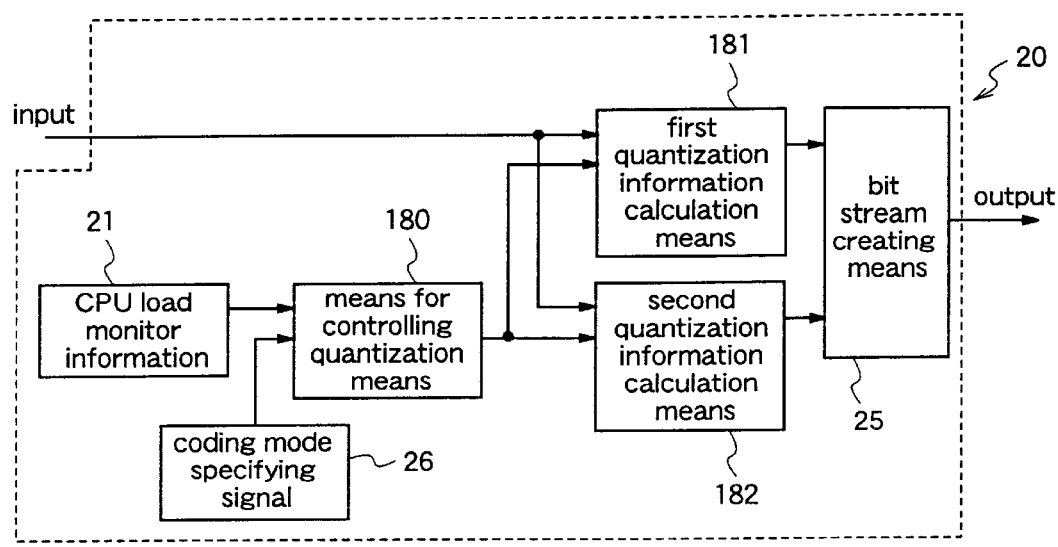
FIG. 18 is a block diagram showing a case where the present invention is applied to a coding process performed by a coding apparatus which performs a coding process according to time/frequency transformation.

Moreover, when using coding schemes according to MPEG2 standard for time-frequency transformation, AAC, Dolby AC-3, ATRAC (MD), instead of the subband coding scheme according to MPEG1, as shown in FIG. 18, respective means for the coding process are replaced by first and second quantization information calculation means 181 and 182 of different operation amounts, one of which is selected by means for controlling quantization means 180, and is used for handling quantization information rather than coding information.

What is claimed is:

1. An audio coding method in which a digital audio signal is divided into a plurality of frequency subbands and a coding process is performed for each subband, wherein there are provided plural bit allocation means according to different processing amounts, for generating bit allocation information for each subband, bit allocation means to be used is changed to perform bit allocation according to external control information such that bit allocation means is selected from the plural bit allocation means and used, subband signals of the plural frequency subbands into which the digital audio signal is divided are separated into groups each composed of a predetermined number of subband signals continuous in a frequency axis direction, the bit allocation is performed for each of the groups, and the bit allocation information is generated for each subband, and allocatable bit calculation means for determining the number of bits allocatable to bit allocation means for each group is provided, for distributing bits allocatable to all groups such that bits are allocated to bit allocation means for each group, by using a ratio of each group to all groups which has been weighted based on characteristics of respective subbands in each group.

2. The audio coding method of claim 1, wherein weighting based on characteristics of respective subbands in each group is weighting based on predetermined minimum audible limit values for respective subbands.

3. The audio coding method of claim 1, wherein weighting based on characteristics of respective subbands in each group is weighting based on subband signal levels of respective frequency subbands in each group obtained by subjecting the input digital audio signal to subband analysis.

4. The audio coding method of claim 1, wherein weighting based on characteristics of respective subbands in each group is weighting based on spectrum signal levels in each group obtained by linearly transforming the input audio signal.

5. An audio coding method in which a digital audio signal is divided into a plurality of frequency subbands and a coding process is performed for each subband, wherein there are provided plural bit allocation means according to different processing amounts, for generating bit allocation information for each subband, bit allocation means to be used is changed to perform bit allocation according to external control information such that bit allocation means is selected from the plural bit allocation means and used, a psychoacoustic model which is capable of controlling a processing amount stepwise is provided, the processing amount of the psychoacoustic model is controlled according to the external control information, and bit allocation information for each subband is generated so that processing is performed by the use of the psychoacoustic model according to a predetermined processing amount.

6. An audio coding method in which a digital audio signal is divided into a plurality of frequency subbands and a coding process is performed for each subband, wherein there are provided plural bit allocation means according to different processing amounts, for generating bit allocation information for each subband, bit allocation means to be used is changed to perform bit allocation according to external control information such that bit allocation means is selected from the plural bit allocation means and used, plural psychoacoustic models according to different processing amounts are provided, and a psychoacoustic model to be used is changed to generate bit allocation information for each subband according to the external control information such that a psychoacoustic model is selected from the plural psychoacoustic models and used to perform processing.

7. The audio coding method of claim 5, wherein the bit allocation means generates bit allocation information for each subband according to information output from a predetermined psychoacoustic model, generates the bit allocation information according to the information output from the predetermined psychoacoustic model every N (N=1, 2, 3 . . . ) frames, and generates bit allocation information for frames for which the bit allocation information is not generated, according to the information output from the psychoacoustic model and signal information of the respective subbands.

8. The audio coding method of claim 6, wherein the bit allocation means generates bit allocation information for each subband according to information output from a predetermined psychoacoustic model, generates the bit allocation information according to the information output from the predetermined psychoacoustic model every N (N=1, 2, 3 . . . ) frames, and generates bit allocation information for frames for which the bit allocation information is not generated, according to the information output from the psychoacoustic model and signal information of the respective subbands.

\* \* \* \* \*